United States Patent
Steen (10) Patent No.: US 7,430,412 B1
(45) Date of Patent: Sep. 30, 2008

(54) DIGITALLY PROGRAMMABLE CONTINUOUSLY VARIABLE PRECISION MICROWAVE ATTENUATOR

(76) Inventor: Richard K. Steen, 8424 US Hwy 69 N., Pollock, TX (US) 75969

( * ) Notice: Subject to any disclaimer, the term of this patent is extended or adjusted under 35 U.S.C. 154(b) by 285 days.

(21) Appl. No.: 10/122,575

(22) Filed: Apr. 15, 2002

(51) Int. Cl.
*H04B 17/00* (2006.01)
*H04M 1/00* (2006.01)
*H04M 9/00* (2006.01)

(52) U.S. Cl. .............. 455/423; 455/67.11; 455/226.4; 379/390.01

(58) Field of Classification Search ......... 381/104–109; 379/388.05, 388.03, 390.01, 406.07, 406.16; 455/423, 67.11, 67.13, 115.1–115.4, 226.1–226.4
See application file for complete search history.

(56) References Cited

U.S. PATENT DOCUMENTS

| | | | | |
|---|---|---|---|---|
| 3,581,198 A * | 5/1971 | Shoemaker et al. | ......... | 324/73.1 |
| 4,105,960 A | 8/1978 | Bacher | ...................... | 333/81 A |
| 4,117,425 A | 9/1978 | Bacher | ...................... | 333/81 A |
| 4,191,995 A * | 3/1980 | Farrow | ........................ | 700/37 |
| 4,249,144 A | 2/1981 | Hurst et al. | ................. | 333/81 R |
| 4,330,765 A | 5/1982 | Patukonis | ................. | 333/81 A |
| 4,438,415 A | 3/1984 | Hopfer | ...................... | 337/81 A |
| 4,625,332 A | 11/1986 | Singer et al. | ................... | 455/67 |
| 4,890,077 A | 12/1989 | Sun | ........................... | 333/81 A |
| 4,978,932 A | 12/1990 | Gupta et al. | ................ | 333/81 R |
| 5,121,075 A | 6/1992 | Roach | ........................ | 330/126 |
| 5,233,317 A | 8/1993 | Snodgrass et al. | ......... | 333/81 A |
| 5,440,280 A | 8/1995 | Lord | ......................... | 333/81 R |
| 5,502,421 A | 3/1996 | Nakahara | .................. | 333/81 R |
| 5,524,060 A * | 6/1996 | Silfvast et al. | .............. | 381/104 |
| 5,703,909 A | 12/1997 | Fang et al. | ................... | 375/295 |
| 5,920,187 A * | 7/1999 | Cosgrove et al. | .............. | 324/74 |
| 6,300,814 B1 | 10/2001 | Takahashi | ................... | 327/308 |
| 6,339,356 B1 | 1/2002 | Daughtry et al. | ............ | 327/308 |
| 6,445,732 B1 * | 9/2002 | Beamish et al. | ............. | 375/224 |
| 6,594,599 B1 * | 7/2003 | Kent et al. | ..................... | 702/84 |
| 6,606,382 B2 * | 8/2003 | Gupta | ................... | 379/406.05 |
| 6,654,594 B1 * | 11/2003 | Hughes et al. | ........... | 455/245.1 |
| 6,704,545 B1 * | 3/2004 | Wala | ........................... | 455/16 |
| 7,006,447 B1 * | 2/2006 | Vaisanen et al. | ............. | 370/252 |
| 2004/0022215 A1 * | 2/2004 | Okuhata et al. | ............. | 370/334 |
| 2005/0159124 A1 * | 7/2005 | Shah | ....................... | 455/226.1 |

OTHER PUBLICATIONS 4 pages(pp. 52,53?,54,55?) of catalog from General Microwave on Series 349 & 349H PIN diode attenuators, Year- 1999.

* cited by examiner

*Primary Examiner*—Duc Nguyen
*Assistant Examiner*—Michael T Thier
(74) *Attorney, Agent, or Firm*—Thompson & Gustavson, L.L.P.

(57) ABSTRACT

An apparatus (10) is disclosed for testing a receiver (18). The apparatus (10) includes a digitally controlled attenuator (30) and controls, including a programmable logic device (38), to control both the final value of attenuation and the rate of change of attenuation from the initial attenuation value in the attenuator (30) to the final value of attenuation. Both the final value of attenuation and the rate of change of attenuation can be selected by the operator on the control panel (20) with attenuation select switches (22) and rate select switch (26). Alternatively, the attenuation can be input with an attenuation control knob (28). A digital display (24) displays the attenuation. The apparatus (10) can be remotely controlled with a GPIB control.

21 Claims, 6 Drawing Sheets

DIGITALLY PROGRAMMABLE CONTINUOUSLY VARIABLE PRECISION MICROWAVE ATTENUATOR

BACKGROUND OF THE INVENTION

Receivers must be capable of receiving a signal of varied strength. When testing a receiver, it is common to use a signal generator to generate a signal of the desired frequency to be tested. The signal generator will typically generate a signal of a given strength. The signal is then fed into an attenuator where the operator attenuates the signal to the desired level to input into the receiver for testing.

A variety of attenuators are known. The attenuator can be a simple manually operated attenuator where the operator moves a switch to different attenuation steps. Other attenuators are electronically operated by a control voltage set between certain limits controlling the degree of attenuation.

In addition to sensitivity, a receiver also must be capable of adjusting gain as the input signal varies strength. A characteristic of the receiver known as the slew rate indicates how quickly the receiver can vary gain with a variation in the input signal strength. It is necessary to test the receiver to determine if the receiver is capable of varying gain at the rated slew rate.

SUMMARY OF THE INVENTION

In accordance with one aspect of the present invention, an apparatus is provided which includes an attenuator having an signal input and a signal output. The attenuator attenuates the signal to a degree determined by a control signal input into the attenuator. A control is provided which has an input for the desired final attenuation value for the signal and an input for the desired rate of change of attenuation to achieve the desired final attenuation value. The control varies the control signal input into the attenuator to control the rate of change of attenuation of the attenuator to be the desired rate and to achieve the final attenuation value.

BRIEF DESCRIPTION OF THE DRAWINGS

A more complete understanding of the invention and its advantages will be apparent from the following Detailed Description when taken in conjunction with the accompanying Drawings, in which.

DETAILED DESCRIPTION

Figure 1:
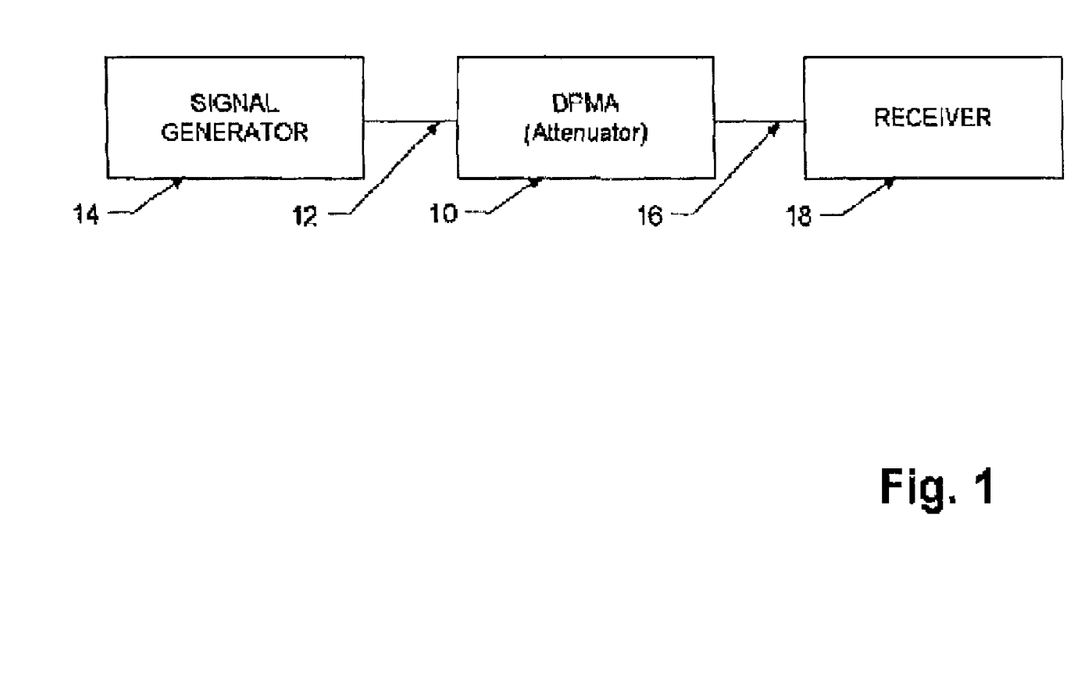
FIG. 1 is an illustration of a receiver testing circuit incorporating an apparatus forming a first embodiment of the present invention.

Referring now to the drawings, where like reference characters designate like or corresponding parts throughout the several views, there is illustrated an apparatus 10 forming a first embodiment of the present invention which forms a digitally programmable continuously variable precision microwave attenuator. As seen FIG. 1, the apparatus 10 is connected between the output 12 of a signal generator 14 and the input 16 of a receiver 18 being tested. As will be described hereinafter, the apparatus 10 functions to attenuate the output signal from the signal generator 14 and also determine the rate of change of attenuation from a present value of attenuation to a desired final value of attenuation.

Figure 2:
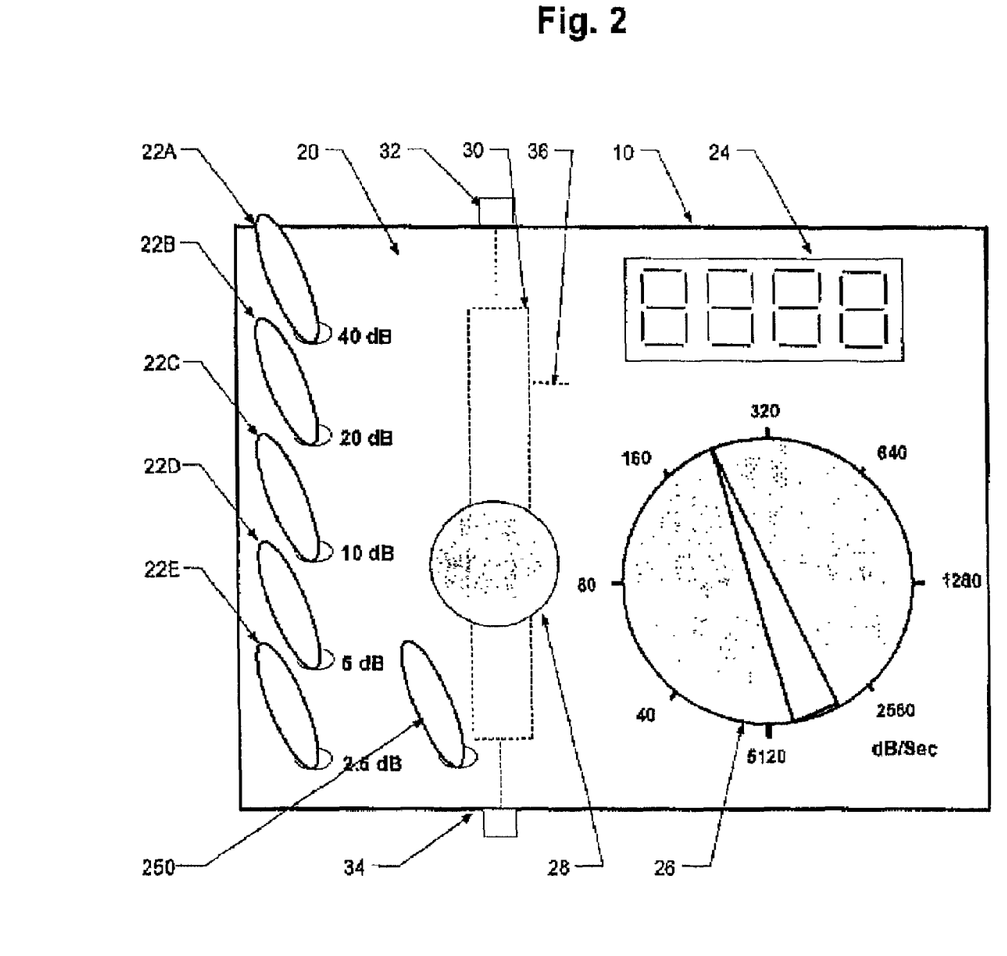
FIG. 2 is an illustration of the control panel of the apparatus.

With reference to FIG. 2, the apparatus 10 can be seen to have a control panel 20. On the control panel 20 are a series of the attenuation selection switches 22 a-e. The operator can select the desired final attenuation by operating the corresponding switch 22. Alternatively, the operator can select the final attenuation with an attenuation control knob 28. A digital display 24, preferably having four digits, provides for display of the current attenuation. A rate selection switch 26 permits the operator to set the rate of change of attenuation from the present attenuation value in the apparatus 10 to the desired final attenuation.

The apparatus 10 includes a variable attenuator which is controlled by a programmable logic device (PLD) 38. The attenuator preferably is a pin diode attenuator 30. The attenuator 30 attenuates the signal entering input 32 of the apparatus 10 and outputs the attenuated signal at output 34. The attenuation is determined by a control signal to control input 36 of attenuator 30. The control signal is typically a digital signal. For example, one suitable type of attenuator 30 is the General Microwave programmable R. F. attenuator series 349 and 349H available from General Microwave Corporation. The series 349 attenuator provides an attenuation range up to about 80 dB in increments of 0.04 dB. The series 349 attenuator employs an 11 bit control signal which allows for a total of 2048 discrete attenuation steps. The series 349 attenuator is capable of switching in the order of 500-2000 ns. The 3496-80 attenuator is preferred, which has a frequency range of 4.5 to 13.5 G Hz. The PLD is preferably a model EPF10K20 P144 Programmable Logic Device available from Altera, 101 Innovation Drive, San Jose, Calif. 95134.

Figure 3A:
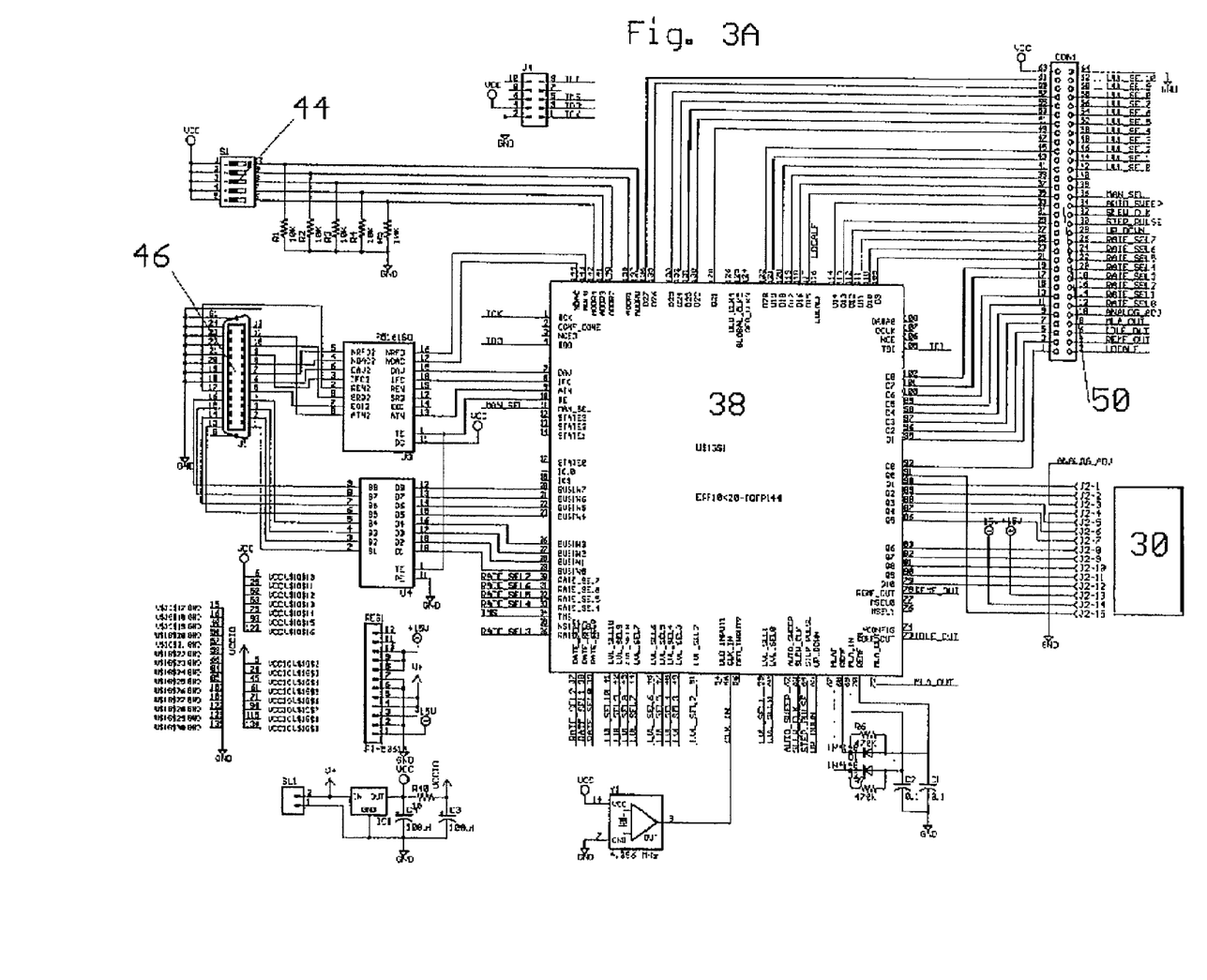
FIGS. 3A and B are the schematic of the apparatus.
Figure 3B:
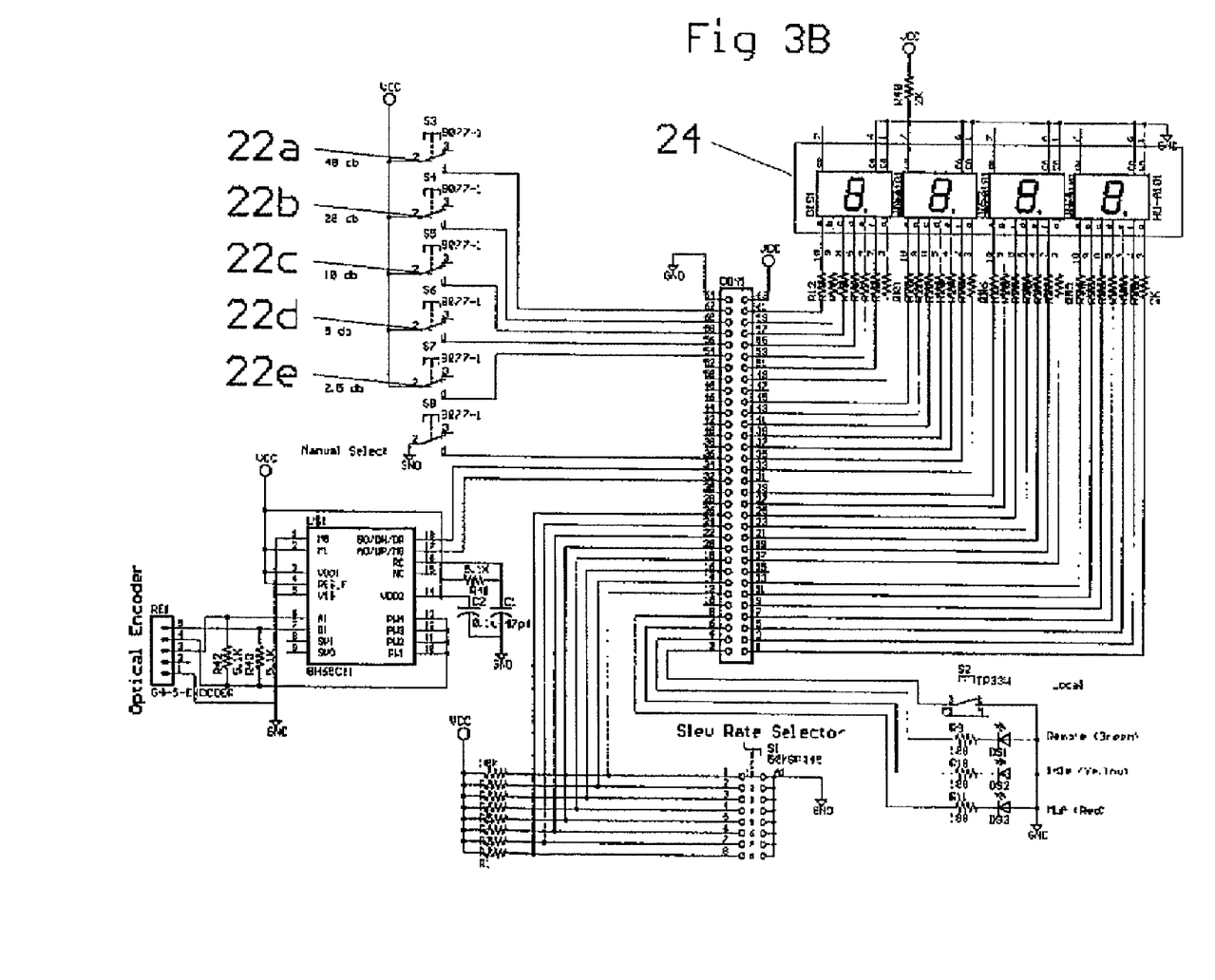
Figure 3C:
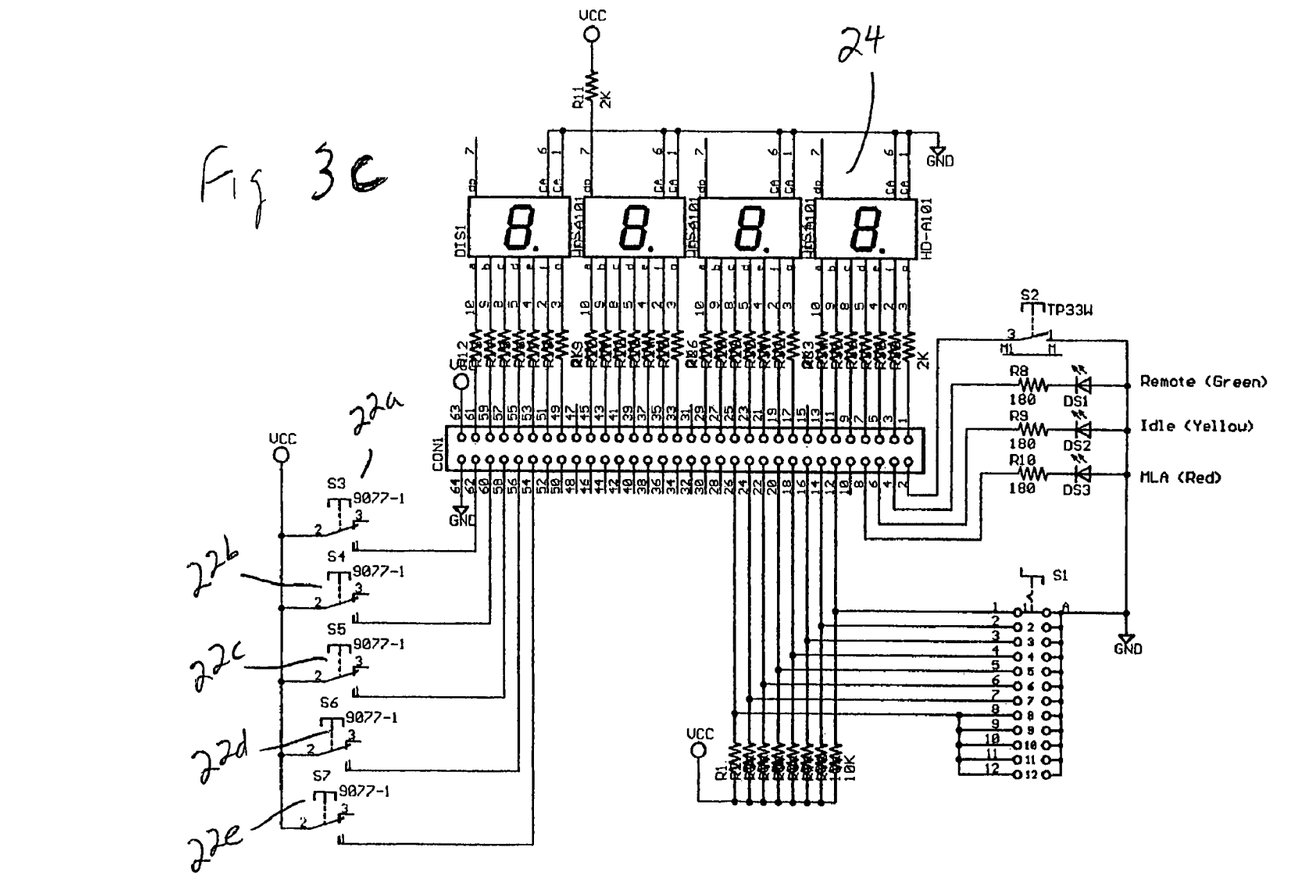

With reference to FIG. 3, the apparatus 10 can be controlled from the control panel 20 or by a remote control systems, such as the GPIB system. When operated by remote control, an MLA address entered into a dip switch 44 informs the PLD of the proper address for the remote control channel controlling the apparatus 10. When the proper address is provided, the remote control operates the settings of the apparatus 10 through connector 46. When using the GPIB standard, a 75161 line driver may be necessary.

If controlled from the control panel 20, the operator will be required to input a desired final value of attenuation. This can be done by closing selected switches 22 a-e. For example switch 22a may be 40 dB attenuation, switch 22b may be 20 dB attenuation, switch 22c may be 10 dB attenuation, switch 22d may be 5 dB attenuation, and switch 22e may be 2.5 dB attenuation. A combination of switches 22 can be selected to attenuate at additional values, for example closing switches 22a, 22b and 22c to achieve 40+20+10=70 dB attenuation. Closing selected switches 22 provides system voltage Vcc to selected pins in the PLD 38 through a connector 50. Alternatively, the operator can rotate attenuation control knob 28, which is attached to an optical encoder, to set the attenuation.

An important feature of the apparatus 10 is the ability for the operator to then select different rates for the apparatus 10 to change from the current attenuation setting in the apparatus 10 to the desired final value of attenuation. For example, the operator can select a desired attenuation rate at rate selection switch 26. Rate selection switch 26 can represent attenuation rates of 40, 80, 160, 320, 640, 1280, 2560 and 5120 dB per second, respectively.

A remote control system would similarly set in the desired final value of attenuation and attenuation rate.

While the PLD 38 is preferred, the apparatus can use a custom designed chip or discrete hardwired components to achieve the same results obtained by the PLD 38. PLD 38 has the advantage of being reprogrammable to allow modifications of the operation of the apparatus depending on customer needs. Also, while remote control with a GPIB system is described, the remote control can be achieved with RS 232, parallel port or other control system.

The apparatus provides great flexibility to the operator in testing the receiver 18. By controlling not only the final value of attenuation of the signal input into the receiver, but also the rate the attenuation changes from the initial value of attenuation in the apparatus 10 to the final value of attenuation selected, the operator can not only test the sensitivity of the receiver, but also its response to a controlled rate of change in signal strength to test the slew rate of the receiver.

Figure 4:
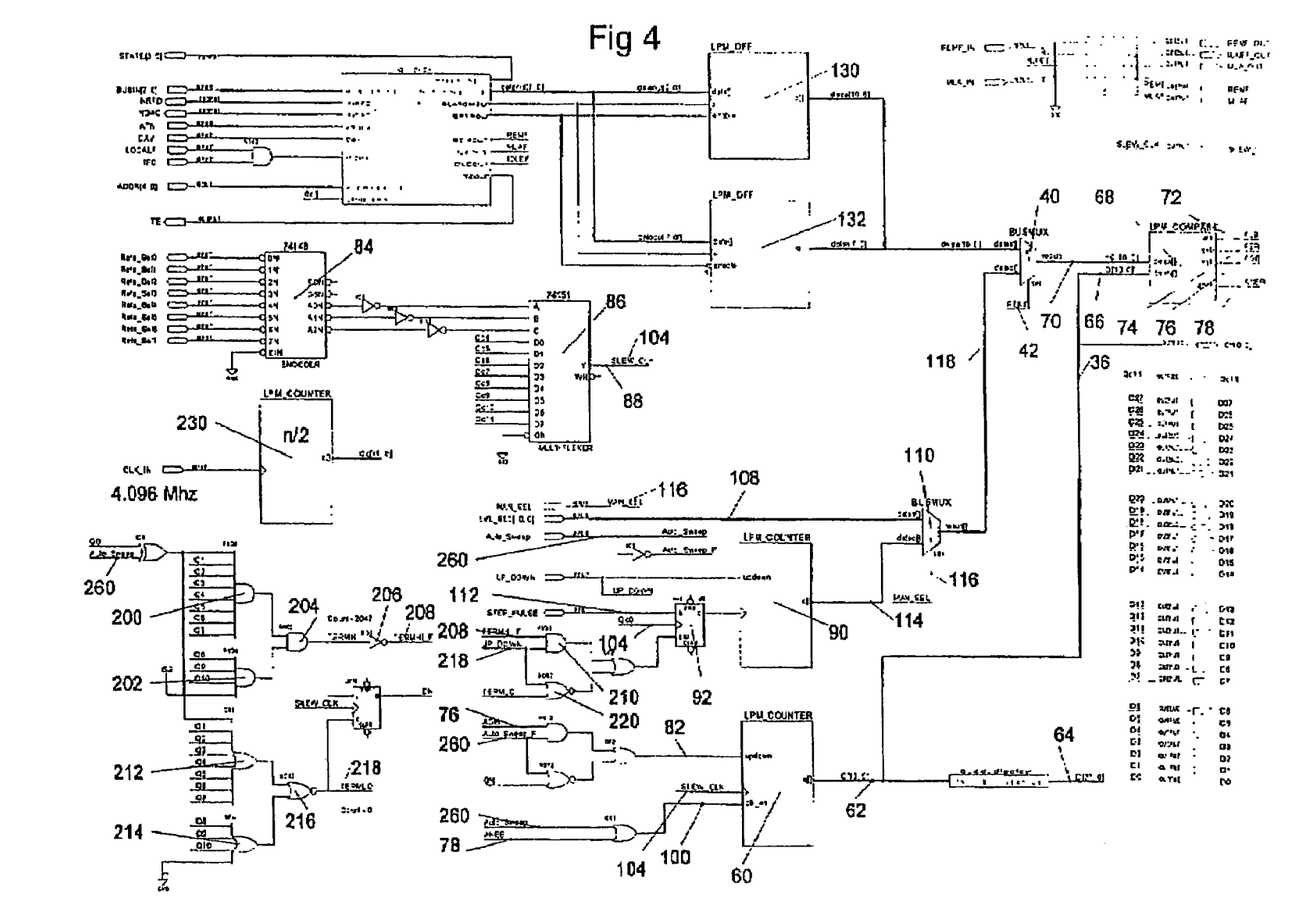
FIG. 4 is the logic of the apparatus.

With reference to FIG. 4, the control logic of the PLD 38 will be described. Preferably, the logic is implemented by the LPM standard which can be incorporated into the Altera PLD noted above. A multiplexer 40 determines if apparatus 10 is controlled by remote control or control panel 20 depending on the input voltage level to select input 42 of multiplexer 40. The LPM counter 60 has an output 62 which is connected to the control input 36 of the attenuator 30 and instructs the attenuator 30 what attenuation is to be set. In addition, the output 62 connects to a series of inputs 64 which control the digital display 24 to display the attenuation. The output 62 also forms the "b" input 66 to an LPM comparator 68. Comparator 68 compares the "a" input 70 representing the desired attenuation setting to the "b" input 66 representing the actual attenuation setting in the attenuator 30. The LPM comparator generates an output at the "a" is less than "b" (ALB) output 72 if this condition is met, the "a" equals "b" (AEB) output 74 if this condition is met, the "a" is greater than "b" (AGB) output 76 if this condition is met and "a," does not equal "b" (ANEB) output 78 if this condition is met. If "a" does not equal "b", the output 78 forms an input 78 to the clock enable input 100 of the LPM counter 60 to begin to count up or down to change the value of attenuation. The counter counts up or down, to increase or decrease the attenuation, depending on the condition of the "a" is greater than "b" output 76, forming input 82 to the updown input to LPM counter 60. The LPM counter 60 counts up or down to change the attenuation in the attenuator 30 until the LPM comparator 68 shows the actual attenuation value equals the desired value. If the signal on the control input 36 has reached the highest value for the 11 bit input, ie 11111111111, all inputs Q0 to Q10 entering AND gates 200 and 202 will be high and the inputs to AND gate 204 will be high, causing inverter 206 to go low and transmit the low signal on line 208 denoted TermHi. Line 208 is one input to an AND gate 210 which causes the LPM counter 90 to switch to counting down. Similarly, if the signal on the control input 36 has reached the lowest value for the 11 bit input, ie 00000000000, all inputs Q0 to Q10 entering OR gates 212 and 214 will be low and the inputs to OR gate 216 will be low, causing the output of OR gate 216 to go high and transmit the high signal on line 218 denoted TermLo. Line 218 is one input to a NOR gate 220 which causes the LPM counter 90 to switch to counting up.

The rate the LPM counter 60 changes the attenuation setting in the attenuator 30 is determined by the slew clock input 104, which is in turn determined by the rate input by the operator either by remote control or on the control panel 20. The output of rate switch 26 is input into a 74148 encoder 84. The encoder 84 sends the value of the selected rate to a 74151 multiplexer 86. A clock source, such as a 4.096 M Hz crystal, is input into LPM counter 230. The LPM counter takes the input signal and outputs a series of clocks signals which are divided by powers of 2. For example, output Qc0 may be 2.048 M Hz, output Qc1 may be 1.024 M Hz, down to Qc10 may be 2 K Hz and Qc11 may be 1 K Hz. With an attenuator 30 that has steps of 0.04 dB/step, 1,000 steps up or down/sec at the clock rate of Qc11 would correspond to a rate of 40 Db/sec. Of course, any change of attenuation rate can be chosen by setting the clock source and output Qc as needed, limited only by the ability of the attenuator 30 to change attenuation. The value input from encoder 84 selects which of the clock rates Qc4 to Qc11 is the output 88 of multiplexer 86. The output 88 forms a slew clock signal 104 which is input into LPM counter 60 and LPM counter 90 to change the attenuation at the rate selected.

If the final value of attenuation is set from the control panel, it is set by either switches 22a-e or by attenuation control knob 28, depending on the position of a manual select switch 250. The attenuation set by the switches 22a-e is input on level select line 108 to a multiplexer 110. The optical encoder output controlled by the attenuation control knob 28 is on line 112 which enters a D flip-flop 92. The output of D flip-flop 92 forms the clock input for the LPM counter 90. The output of LPM counter 90, in turn, forms the second input 114 to multiplexer 110. The manual select switch 250 sets the state of the manual select line 116. The state of the manual select line 116 determines if the attenuation switches 22a-e or attenuation control knob 28 determines the output 118 of the multiplexer 110. The output 118 forms one of the two inputs to the multiplexer 40, the other input being formed by the signal from the remote control system. The output of the multiplexer 40, which represents the desired final value of attenuation, forms the input "a" to the LPM comparator 68.

The remote control system input is passed through two LPM D flip-flops 130 and 132 before input into the multiplexer 40.

The apparatus 10 is preferably designed to test signals in the 1.0 to 18.0 G Hz range, and particularly in the 6.0 to 12.0 G Hz range.

One advantage of the present invention is the ability to shift quickly between two different final attenuation values at the desired rate by simply flipping the manual select switch 250 back and forth to switch the output of the Multiplexer 110 between the level select line 108 and input 114. For example, the switches 22a-e could be set to 40 dB attenuation and the attenuation control knob 28 set to 60 dB attenuation. The apparatus can then be quickly shifted from a final attenuation of 40 dB to 60 dB and back to 40 dB simply by flipping the switch 250.

An autosweep signal can be input on lines 260 which causes the apparatus to oscillate between minimum attenuation and maximum attenuation at the set rate.

The apparatus 10 preferably changes attenuation at the desired rate the instant the operator or remote control system inputs a final attenuation value different than that set in the attenuator 30. However, the apparatus 10 can be programmed to execute a series of attenuation changes and rates to perform a set sequence of testing levels and can initiate the attenuation change selected on the apparatus by pressing a go button or by automatically starting the change after a set delay.

While a single embodiment of the present invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope and spirit of the invention.

The invention claimed is:

1. An apparatus for testing a receiver by setting a receiver input signal level, comprising:
   an attenuator having a signal input and a signal output, the attenuator capable of attenuating a signal to multiple non-infinite levels, the signal input being an analog signal of known strength, the signal output being the receiver input signal, the attenuator attenuating the signal to a degree determined by a digital control signal input to the attenuator;

a control having an input for a desired final attenuation test value for the signal and an input for a desired test rate of change of attenuation to achieve the desired final attenuation test value, the control varying the digital control signal to the attenuator to control the test rate of change of attenuation of the attenuator to the desired rate by incrementally stepping attenuation in sufficiently small increments of attenuation spaced over sufficiently long time intervals to test the automatic gain circuit of the receiver at the maximum slew rate a functioning receiver can maintain lock on the fluctuating input signal and the final attenuation to be the desired final attenuation test value, the control being independent of the analog signal input.

2. The apparatus of claim 1 wherein the control has a rate switch for operator input of the desired rate of change of attenuation.

3. The apparatus of claim 1 wherein the control has a plurality of attenuation switches for operator input of the desired final attenuation value.

4. The apparatus of claim 1 wherein the apparatus further has a control panel with an attenuation control knob for varying the desired attenuation.

5. The apparatus of claim 1 wherein the control permits a desired rate of change of attenuation varying from 40 dB per second to 5120 dB per second.

6. The apparatus of claim 1 wherein the desired final attenuation value varies between 0 dB and about 80 dB.

7. The apparatus of claim 1 wherein the input for the control can either be direct or through a remote control such as a GPIB interface, RS 232 interface or parallel port interface for automated system testing.

8. The apparatus of claim 1 wherein the control has a display for displaying the attenuation of the attenuator.

9. The apparatus of claim 1 wherein the control is a programmable logic device.

10. The apparatus of claim 1 wherein the frequency range of the attenuated signal is between 6.0 and 12.0 G Hz.

11. The apparatus of claim 1 further comprising a case, the case containing the attenuator and control, the case further mounting a rate selector for manually selecting the rate of change of attenuation and an attenuation selector for manually selecting the final attenuation value, the case being physically connected to the signal generator and receiver under test only by connectors carrying the analog test signal from the signal generator to the apparatus and the attenuated analog test signal from the apparatus to the receiver under test, the case being physically connected to a remote control device for controlling operation of the apparatus only by connectors carrying digital signals to the apparatus to set the rate of change of attenuation and final attenuation value in the apparatus.

12. The apparatus of claim 1 wherein the frequency of the attenuated signal is a microwave frequency.

13. An apparatus for setting a receiver input signal level to perform automated system testing of the receiver, comprising:

an attenuator having a signal input of predetermined strength and a signal output, the attenuator attenuating the signal to a degree determined by a control signal input to the attenuator;

a control operable either directly or by remote control, said control having a first operator input for a first desired predetermined final attenuation test value for the signal and a second operator input for a second desired predetermined final attenuation test value, the control being independent of the signal input the control further having a selector for operation by the operator, the selector in a first state causing the control signal to vary the attenuation value from the present attenuation value to the first desired predetermined final attenuation value and a second state causing the control signal to vary the attenuation value from the present attenuation value to the second desired predetermined final attenuation value, the operator alternatively selecting the first and second states on the selector causing the control signal to vary the attenuation value between the first and second predetermined final attenuation values, the control further having an input for the desired rate of change of attenuation to achieve the desired final attenuation values.

14. The apparatus of claim 13 wherein the first operator input is a series of switches for 2.5, 5, 10, 20 and 40 dB attenuation, the second operator input being an attenuation control knob for varying the desired attenuation between 0 and 80 dB in 0.04 dB steps.

15. The apparatus of claim 13 wherein the input for the desired rate of change of attenuation is an attenuation control knob.

16. The apparatus of claim 13 wherein the input for the desired rate of change of attenuation can be set for 40, 80, 160, 320, 640, 1280, 2560 and 5120 dB/sec.

17. The apparatus of claim 13 wherein the first and second operator input and selector state are done by remote control through a GPIB, RS 232 or parallel port interface.

18. A method for setting a receiver input signal level for automated system testing of the receiver, comprising the steps of:

providing a predetermined non-varying analog signal input to an attenuator, the attenuator attenuating the signal to a degree determined by a control signal input to the attenuator;

setting a first control either directly or by remote control to a desired final attenuation test value for the analog signal and setting a second control either directly or by remote control to the desired test rate of change of attenuation to achieve the desired final attenuation test value, the controls varying the control signal to control the rate of change of attenuation of the attenuator to the desired test rate by incrementally stepping attenuation in sufficiently small increments of attenuation spaced over sufficiently long time intervals to test the automatic gain circuit of the receiver at the maximum slew rate a functioning receiver can maintain lock on the fluctuating input signal and the final attenuation to be the desired final attenuation test value, the controls being independent of the analog signal input.

19. The method of claim 18 wherein the step of setting a first control to a desired final attenuation value further comprises the steps of setting one or more of a series of switches, each switch corresponding to a predetermined attenuation value, the step of setting a second control to the desired rate of change of attenuation further comprising the step of setting a switch to a position corresponding to the desired rate of change of attenuation.

20. The method of claim 18 wherein the step of setting a first control to a desired final attenuation value further comprises the steps of either setting one of more of a series of switches, each switch corresponding to a predetermined attenuation value, or setting an attenuation control knob to the desired final attenuation value, the method further including the step of selectively actuating a switch to set the desired final attenuation value by the series of switches or the attenuation control knob to vary the attenuation between the value set by the series of switches and the value set by the attenuation control knob.

21. The method of claim 18 wherein the step of setting the first control and the second control is done by remote control through a OPIB, RS 232 or parallel port interface for automated system testing.

* * * * *